United States Patent Office 3,781,370
Patented Dec. 25, 1973

3,781,370
NOVEL FLUORINATED ALCOHOLS
Louis G. Anello, Orchard Park, and Richard F. Sweeney, Elma, N.Y., and Morton H. Litt, Cleveland, Ohio., assignors to Allied Chemical Corporation, New York, N.Y.
No Drawing. Continuation-in-part of abandoned application Ser. No. 721,089, Apr. 12, 1968, which is a continuation-in-part of application Ser. No. 633,359, Apr. 25, 1967, now Patent No. 3,514,487. This application Dec. 18, 1970, Ser. No. 99,722
Int. Cl. C07c 43/00
U.S. Cl. 260—615 F     5 Claims

ABSTRACT OF THE DISCLOSURE

Novel alcohols of the formula:

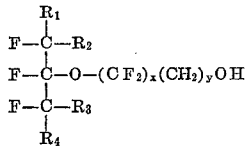

wherein
(a) $R_1$–$R_4$ are each independently selected from the group consisting of F, Cl, and perhaloalkyl groups having from 1–9 carbon atoms in which the halo atoms are selected from fluoro and chloro, or when taken together the $R_1$ and $R_4$ groups may be perhaloalkylene groups forming a cycloaliphatic structure having from 4–6 carbon atoms in which the halo atoms are selected from fluoro and chloro, with the proviso that no more than three of the $R_1$–$R_4$ groups are perhaloalkyl groups; and
(b) $x$ may be an odd or even integer from 3–20 and $y$ may be an odd or even integer from 2–20;

are useful as surfactants and as solvents for solution polymerization, and as intermediates for the production of a variety of acids, acid derivatives and polyacrylates which are valuable as surfactants and oil, stain and water repellent compositions.

CROSS-REFERENCES TO RELATED APPLICATIONS (1) This application is a continuation-in-part of our co-pending application Ser. No. 721,089, filed Apr. 12, 1968, and now abandoned, which in turn is a continuation-in-part of our parent application Ser. No. 633,359, filed Apr. 25, 1967, entitled "Telomers and Process for the Preparation Thereof," now U.S. Pat. 3,514,487.

Other related applications and patents are:
(2) U.S. Pat. 3,453,333;
(3) U.S. Pat. 3,470,256;
(4) Co-pending application of Anello et al., entitled "Novel Sulfates and Method for Their Preparation," Ser. No. 633,368, filed Apr. 25, 1967;
(5) Our co-pending application entitled "Fluorocarbon Compounds," Ser. No. 721,117, filed Apr. 12, 1968, now U.S. Pat. 3,706,773;
(6) Our co-pending application entitled "Fluorocarbon Acids and Derivatives," Ser. No. 721,115, filed Apr. 12, 1968, now U.S. Pat. 3,697,564; and
(7) U.S. Pat. 3,547,861.

BACKGROUND OF THE INVENTION

A variety of fluorinated alcohols are known to be useful for the production of acids, acid derivatives and polyacrylates which have surface-active and oil, stain and water repellent properties.

The present invention is directed to a novel class of fluorinated alcohols which are generally characterized in having a polyfluoroisoalkyl tail linked through an oxygen atom to an alkanol moiety. These alcohols have not been suggested in the prior art and produce unexpectedly superior surface-active agents and oil, stain and water repellent agents.

SUMMARY OF THE INVENTION

The novel fluorinated alcohols of the invention have the following formula

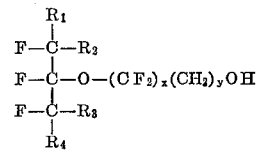

wherein $R_1$–$R_4$ are each independently selected from the group consisting of F, Cl and perhaloalkyl groups having from 1–9 carbon atoms in which the halo atoms are selected from fluoro and chloro or, when taken together, the $R_1$ and $R_4$ groups may be perhaloalkylene groups forming a cycloaliphatic structure having from 4–6 carbon atoms in which the halo atoms are selected from fluoro and chloro, with the proviso that no more than three of the $R_1$–$R_4$ groups are perhaloalkyl groups, $x$ may be an odd or even integer from 3–20 and $y$ may be an odd or even integer from 2–20.

The criticality in the molecule of these alcohols is in the structure of the tail portion and its linkage to the remainder of the molecule. The tail portion is characterized by the presence of a carbon atom linking an oxygen atom and a fluorine atom, in combination with two haloalkyl linkages, satisfying the remaining valences of the carbon atom linking the oxygen and fluorine atoms. The haloalkyl linkages are characterized by the presence of at least one fluorine atom on each carbon atom which is adjacent the carbon atom which links the oxygen and fluorine atoms. Additionally, the molecule is characterized by the fact that both carbon atoms which are linked to the oxygen atom contain at least one fluorine atom.

In the above Formula I, each of the $R_1$–$R_4$ groups may be the same or different. The perhaloalkyl groups, if any, may be straight-chain or branched-chain.

It has been found that the novel alcohols of the invention are useful as surfactants and as solvents for solution polymerization, and also as intermediates for the production of superior polyacrylate oil, stain and water repellent agents.

The novel alcohols of the invention may be prepared from the corresponding telomers of the formula (II)

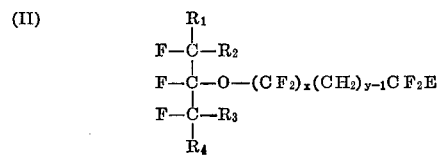

wherein $R_1$–$R_4$, $x$ and $y$ are as defined above, and wherein E is iodine or bromine, by reaction with $SO_3$ to produce the corresponding acid halide, reacting the acid halide with an alkanol, at temperatures in the range of about 0–25° C. to form the corresponding ester, followed by reduction of the ester with a mild reducing agent such as $LiAlH_4$ in ether to form the desired alcohol.

Another generalized route to these alcohols is to react the corresponding telomers of the formula:

(III)
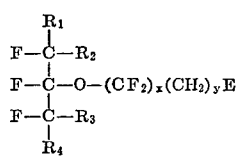

wherein $R_1$–$R_4$, $x$, $y$ and E are as defined above, with $SO_3$ to form the corresponding polysulfates, followed by hydrolysis of the polysulfate with 35–50% $H_2SO_4$ at about 100° C. to the desired alcohol.

Telomer starting materials for these reactions, and preparation thereof, are disclosed in our parent application Ser. No. 633,359, filed Apr. 25, 1967, now U.S. Pat. 3,514,487, the pertinent subject matter of which is hereby incorporated by reference. Essentially, these telomer starting materials may be prepared by telomerizing corresponding telogens of the formula (IV)
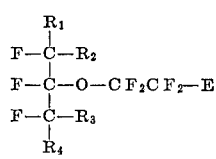

wherein $R_1$–$R_4$ are as defined above, and wherein E is selected from the group consisting of iodine and bromine. The reaction of the telogens of Formula IV with a suitable telomerizable unsaturated material will give repeating units of the telomerizable unsaturated material in the molecule.

The telomerization reaction is carried out under free radical conditions. The free radicals are preferably produced by thermal initiation of the reaction and this is accomplished simply by heating the reactants to an elevated temperature. The reaction conditions normally will vary to some extent, depending on the particular reactants and the type of product desired. The temperature should normally be between about 100° C. and 350° C., preferably between about 150–200° C. Furthermore, although the reaction may be conducted at atmospheric pressure, superatmospheric pressures, for example, up to about 20,000 p.s.i.g. may be used with pressures between about 100 p.s.i.g. and about 10,000 p.s.i.g. being especially preferred. The reaction time is whatever is required to give satisfactory conversions and the optimum reaction time will depend on the particular reactants employed, on the temperature and on the method of unsaturated compound addition. For example, if the telogen and unsaturated compound are charged initially and heated to a temperature of about 200° C., the reaction is substantially complete in about 3 hours. On the other hand, if portionwise or continuous addition of tetrafluoroethylene is used, for example, the reaction time is dependent on temperature and the rate of unsaturated compound addition. It is additionally believed that the chain length of the product obtained is influenced by the reaction time at least to a certain extent. Normally, the reaction time may range from about 10 minutes to about 2 weeks, usually from about 1 hour, to about 48 hours.

If desired, the telomerization reaction may be conducted by use of a catalyst or light of sufficient intensity to initiate the free radical reaction. Illustrative free radical generating catalysts include azonitriles such as alpha, alpha'-azobisisobutyronitrile and organic peroxides such as benzoyl peroxide, acetyl peroxide and pelargonyl peroxide. The use of such initiators allows operation at a lower temperature but gives a somewhat more complex product mixture because of incorporation of catalyst fragments in the telomer mixture, or results in a higher molecular weight distribution in the telomer product.

The telomerization reaction may be carried out in various ways. For example, the telogen and the unsaturated compound may be introduced into an autoclave which is then sealed and heated, preferably with agitation such as by stirring or shaking, until the pressure drop indicates that the reaction has proceeded to the desired extent. In such an operation, the molar ratio of unsaturated compound to telogen is of importance in determining the molecular weight of the telomer product. In general, the average molecular weight of the product is dependent upon the molar ratio of unsaturated compound to telogen; the higher the unsaturated compound:telogen molar ratio, the higher will be the average molecular weight of the telomer product. The ratio of telogen to unsaturated compound may vary from about 1:75 to as high as 200:1, the preferred ratio for batchwise operation being about 1:1 to 2:1 in the production of relatively low molecular weight telomers, i.e. telomers containing up to about 6 or 7 monomer units per telomer molecular. On the other hand, in a constant pressure reaction, i.e. where a constant pressure of unsaturated compound is maintained above the liquid phase comprising the telogen during the reaction the molecular weight of telomer product may be controlled by varying the pressure of the unsaturated compound. In general, the higher the pressure of the unsaturated compound, the higher the molecular weight of the telomer product.

The telomerization reaction inherently produces a mixture of telomers of varying chain lengths and corresponding varying molecular weights. The average chain length and the spread of molecular weight produced by the telomerization reaction may be controlled within limits as discussed above by varying the reactant proportions, reaction time, reaction temperature, reaction pressure and other reaction variables. If desired, individual telomer products can be separated from mixtures thereof by conventional separatory techniques, for example, by fractional distillation, fractional crystallization using an inert solvent such as diethyl ether, or the mixture of telomer products may be separated into fractions of narrower ranges of molecular weights having a desired viscosity or other properties.

Telogen starting materials may be prepared by reaction of an appropriate halogenated ketone with an ionizable fluoride salt to form a fluorinated organic salt and then reacting the organic salt with a halogen other than fluorine (e.g. iodine, bromine) and tetrafluoroethylene to form the desired telogen. This reaction is more fully described in U.S. Pat. 3,453,333 and in U.S. Pat. 3,470,256, pertinent subject matter of which is hereby incorporated by reference. For example, as is described in Examples 1 and 3 of the former patent, the telogen perfluoroisopropoxyethyl iodide, $(CF_3)_2CFOCF_2CF_2I$, may be prepared by reacting hexafluoroacetone with potassium fluoride in an acetonitrile solvent to produce the corresponding addition compound having the formula $$(CF_3)_2CFO^-K^+$$

and thereafter reacting this addition compound with tetrafluoroethylene and iodine in the presence of an inert organic solvent to form the desired perfluoroisopropoxyethyl iodide, $(CF_3)_2CFOCF_2CF_2I$.

Telomers according to Fomula II wherein $x$ is an even integer of at least 4 and $y$ is an odd integer of at least 3, may be obtained by reacting a suitable telogen with tetrafluoroethylene to form a telomer and then reacting the telomer thus produced with ethylene followed by reaction with vinylidene fluoride.

As can be seen from the above description, the telomers produced can serve as telogens for further reactions. The term telogen will be used in this sense herein. In other words, the telogen may be a telomer product produced from a telogen, which telomer produced is further telomerizable.

The telomerizable unsaturated materials are selected from the group consisting of $CF_3=CF_2$, $CF_2=CH_2$, and $CH_2=CH_2$.

DESCRIPTION OF THE PREFERRED EMBODIMENTS

A preferred class of fluorinated alcohols is that in which $R_1$–$R_4$ in above Formula I are perfluoroalkyl groups or F.

Depending upon whether the values of $x$ and $y$ in above Formula I are to be odd or even and upon the length of the various $CF_2$ and $CH_2$ chains, the preferred routes to the alcohols will vary. Preferred routes are outlined below:

(1) When $x$ in Formula I is an even integer from 4 to 20, and $y$ is an odd or even integer from 3 to 20, the alcohols may be produced by reduction of the corresponding iodo alcohol with lithium aluminum hydride ($LiAlH_4$) or with zinc and alcohol. The production of such iodo alcohols may be effected by reacting a perhaloisopropoxy fluoroalkyl iodide having "$x$" $CF_2$ groups in the alkyl chain with an allyl alcohol having $y-2$ (i.e. 1–18) $CH_2$ group in the chain attached to the terminal OH group. The equations set forth below illustrate these reactions:

(1a)
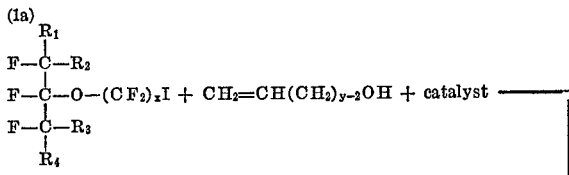

(1b)
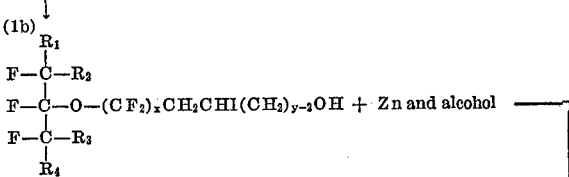

(1c)
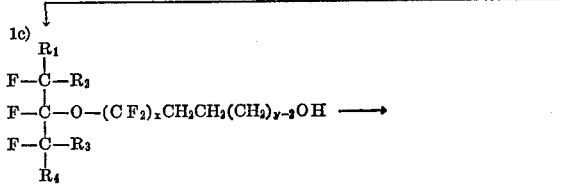

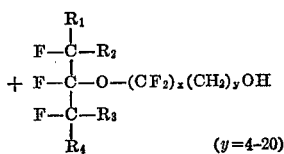
($y=4$–$20$)

(2) When $x$ is an odd integer from 3 to 19 and $y$ is an even or odd integer from 4 to 20, the resulting alcohols can be prepared by reacting a perhaloisoalkoxy acid having an odd number of $CF_2$ groups in the fluoroalkane chain with $Ag_2O$ to form the silver salt; reacting the silver salt with iodine to form the perhaloisoalkoxy perfluoroalkyl iodide, then reacting the perhaloisoalkoxy perfluoroalkyl iodide with an unsaturated alcohol such as allyl alcohol, and removing the iodine as with zinc and alcohol as illustrated in the equation below:

(2a)
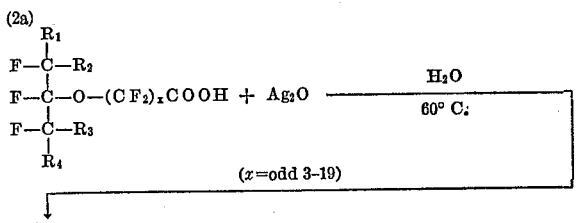

(2b)
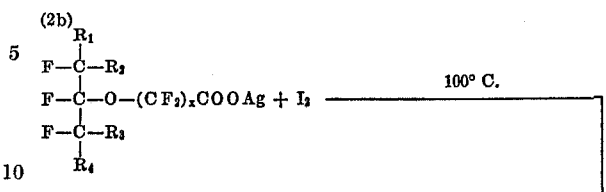

(2c)
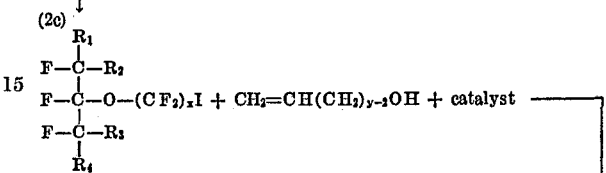

(2d)
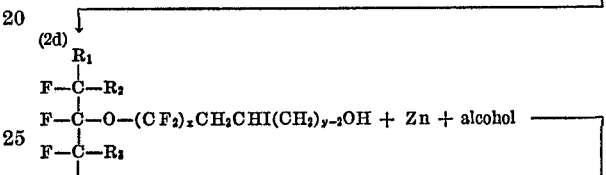

(2e)
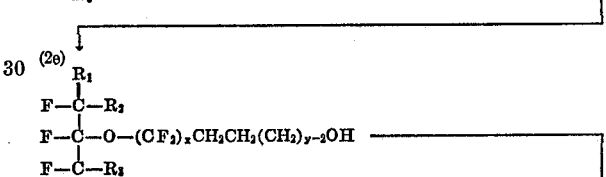

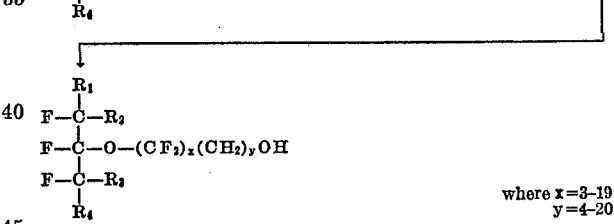
where $x=3$–$19$
$y=4$–$20$ (3 and 4) When $x$ is an even integer from 4 to 16 and $y$ is 2 to 3, the alcohols can be made by converting the appropriate iodide to the pyrosulfate with $SO_3$ or to the hydrosulfate with oleum, and hydrolyzing the fluoroalkoxy dialkyl pyrosulfate or hydrogen sulfate to the alcohol with aqueous acid as shown in the equations below.

(3a)
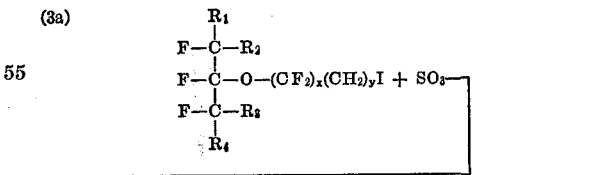

(3b)
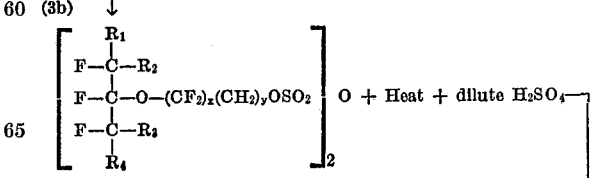

(3c)
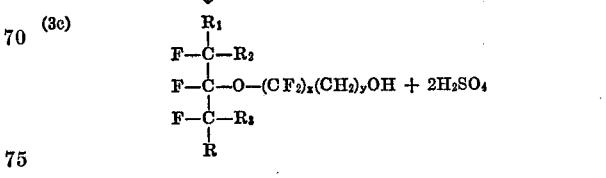

(4) From the hydrogen sulfate (oleum)

(4a) 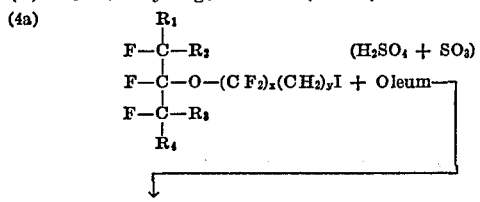 (H₂SO₄ + SO₃)

(4b) 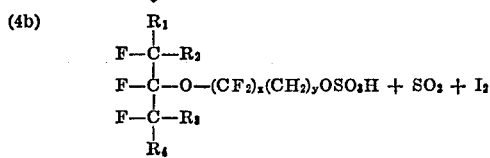

(4c) 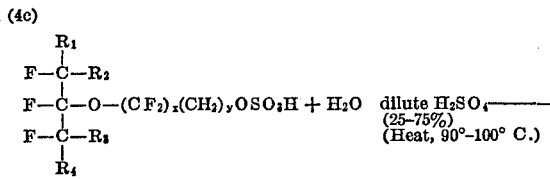

$x=4\text{-}16$ even; $y=2\text{-}3$.

Alcohols according to Formula I having —CH₂— chains of any desired length of two or more carbon atoms can be prepared by reacting a suitable telomer iodide with ethylene to produce an iodide that can be converted to the desired alcohol by the procedure described above, or with an ethylenically unsaturated alcohol such as allyl alcohol (CH₂=CH₂—CH₂OH) as shown in the Equations 5 and 6 below:

(5) 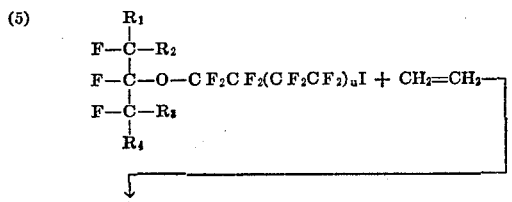

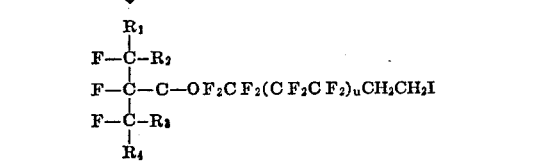

(6) 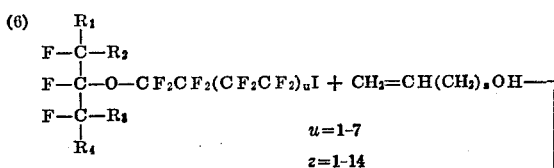

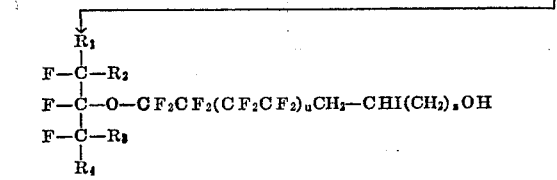

followed by reduction of the iodoalcohol to the desired alcohol with a suitable reducing agent, such as lithium aluminum hydride (LiAlH₄).

When alcohols with an odd number of —CF₂— groups are desired, these can be obtained by reacting a polyfluoroisoalkoxy perfluoroalkyl iodide having an even number of —CF₂— groups, with SO₃, esterifying the resulting reaction product, reducing the ester to the alcohol, as shown in the equations of group (1) above, and reacting the alcohol with p-toluene sulfonyl chloride and metallic iodide to form the iodide containing $m-1$ (CF₂) groups and one CH₂ group. These iodides may then be reacted with ethylene or an ethylenically unsaturated alcohol, as described above, to provide the desired number of CH₂ groups followed by reduction or other conversion to the desired alcohol, as appropriate and as further described above.

With reference to Formula I, R₁–R₄ are preferably F or perfluoroalkyl groups. If perfluoroalkyl groups, R₁–R₄ preferably contain 1–2 carbon atoms.

Specific examples of embodiments of the novel alcohols of the invention as defined both by Formula I include the following:

(6)

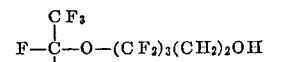

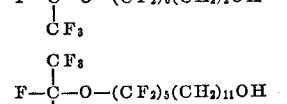

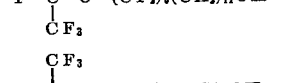

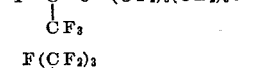

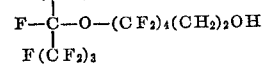

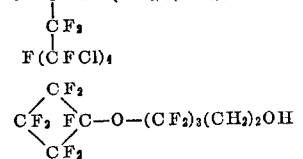

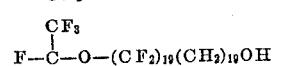

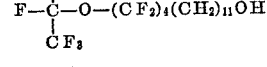

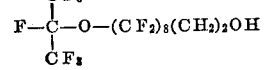

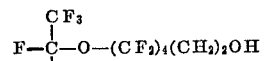

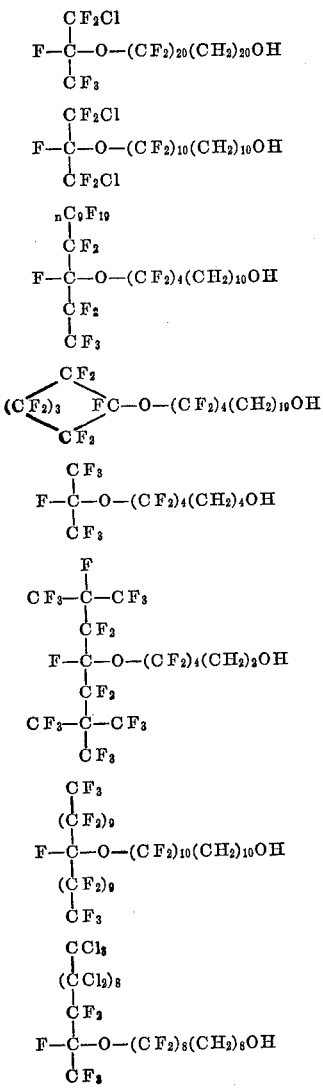

The novel alcohols of the invention may be converted directly to corresponding acrylates and methacrylates by reacting with conventional acrylic reagents in a conventional manner. The acrylates and methacrylates may, in turn, be polymerized in a conventional manner to valuable oil, stain, and water repellent agents useful in treating textiles and other substrates. For example, the acrylic reagent may be acrylic acid or methacrylic acid or the corresponding acid chlorides. The reaction with the acrylic reagent is slightly exothermic but, preferably, temperatures are elevated to 100° C. and are maintained at that level for about 20 hours in order to obtain high yields of the acrylic monomers. The acrylic monomers can be purified by water washing, drying and fractional distillation. Polymerization of the acrylate monomers is typically carried out in the presence of a free radical initiator. A suitable operating temperature for emulsion polymerization in the presence of a free radical initiator is about 55° C. Reaction times of about 2-6 hours should be employed to give good yields of the polyacrylic materials. The acrylic monomers may be co-polymerized by the same technique for homopolymerization with a variety of co-monomers such as N-methylolacrylamide and other acrylic monomers including dissimilar monomers derived as disclosed herein as well as conventional types of acrylic monomers, such as methyl methacrylate, methacrylic acid and 2-ethylhexyl acrylate. Other polymerizable vinyl compounds are suitable for use as co-monomers. Other suitable co-monomers will readily occur to those skilled in the art. These novel copolymers as well as the novel homopolymers possess excellent oil, stain and water repellent properties, including excellent durability to laundering, cleaning and wearing. The acrylic monomers and polymers thereof produced from the novel alcohols of this invention are novel and are disclosed in more detail in U.S. Pat. 3,547,861 mentioned supra.

A preferred embodiment of the invention is that in which $x$ is an integer from 4-20, and particularly when $x$ is an even integer. Another preferred embodiment is that in which $x$ is an even number from 4 to 10 and $y$ is an even integer from 2 to 10. Yet another preferred embodiment is that in which $x$ is an even integer from 4 to 10 and $y$ is an integer from 2 to 3.

The novel alcohols of the invention are useful as surface active agents and may also be converted to other useful surface active agents. For example, the alcohols may be oxidized with a permanganate or dichromate solution to the corresponding acids. The acids may then be converted to the acid salts by neutralization with an inorganic base. The acid salts thus produced exhibit unusually high surface active properties. The alcohol or acid salt surface active agents may be used in the manner in which surface active agents are conventionally employed, such as in the preparation of emulsions and surface coatings and to increase wettability such as in the dyeing of textile fabrics.

The following examples provide a further description of the invention, it being understood that these examples are given for purposes of illustration only and are not to be regarded as restricting the invention beyond the scope of the appended claims. Parts are by weight except as otherwise noted.

EXAMPLE 1

Preparation of 3,3,4,4,5,5,6,6-octafluoro-6-heptafluoroisopropoxy-1-hexanol

Into a two liter, 3-necked flask equipped with heater, stirrer, dropping funnel, thermometer and condenser, were charged 200 grams of 20% oleum. The flask was heated to 90° C. and 100 grams (0.185 mole) of 3,3,4,4,5,5,6,6-octafluoro-6-heptafluoroisopropoxy-1-hexyl iodide were added over a 15 minute period while maintaining the mixture at 90°–100° C. The reaction mixture was stirred at 100° C. for an additional hour, then cooled to 25° C. in an ice bath. Then 840 grams of water were added slowly, the temperature rising to 70° C. The resulting mixture was heated to 100° C. and maintained at that temperature for 16 hours. The mixture was washed with $Na_2S_2O_5$ to neutralize elemental iodine and the resulting water-insoluble oil was separated, dried and distilled, yielding 50.2 grams (0.117 mole) of 3,3,4,4,5,5,6,6-octafluoro-6-heptafluoroisopropoxy-1-hexanol, $$(CF_3)_2CFOCF_2CF_2CF_2CF_2CH_2CH_2OH$$

boiling at 63° C./4 mm., corresponding to a conversion of 63% and a yield of 63%.

Analysis showed for $C_9F_{15}H_5O_2$. Theoretical (percent): C, 25.12; F, 66.28; H, 1.16. Found (percent): C, 24.48; F, 66.41; H, 1.21.

EXAMPLE 2

Preparation of $(CF_3)_2CFOCF_2CF_2(CF_2CF_2)_2CH_2CH_2OH$

A 2 liter 3-necked flask was charged with 1005 grams of 20% oleum. Then 615 grams (0.96 mole) of $$(CF_3)_2CFOCF_2CF_2(CF_2CF_2)_2CH_2CH_2I$$

were added at a temperature between 95–100° C. over a period of 1.5 hours. The mixture was then maintained at a temperature of 100° C. for an additional 1.5 hour period. The resulting reaction mixture was added to 2,200 ml. of water containing 145 grams of $Na_2S_2O_5$ to effect hydrolysis to the alcohol and to remove iodine. The hydrolyzed mixture was then heated at 100° C. for 1 hour.

After cooling, the organic phase was taken up in ether, dried and the ether flashed off. Distillation of the oily residue gave 368 grams (0.69 mole) of $(CF_3)_2CFOCF_2CF_2(CF_2CF_2)_2CH_2CH_2OH$ B.P. 80–82° C./4 mm. Conversion and yield of the alcohol product was 72.5%.

Analysis showed for $C_{11}F_{19}H_5O_2$. Theoretical (percent): C, 24.91; F, 68.11; H, 0.94. Found (percent): C, 25.02; F, 68.52; H, 1.12.

EXAMPLE 3

Preparation of $(CF_3)_2CFOCF_2CF_2(CF_2CF_2)_3CH_2CH_2OH$

A 1 liter 3-necked flask was charged with 380 grams of 20% oleum. Then 190 grams (0.26 mole) of $(CF_3)_2CFOCF_2CF_2(CF_2CF_2)_3CH_2CH_2I$ were slowly added to the flask over a period of 2 hours at a temperature between about 90–100° C. The resulting mixture was then added to a flask containing 1,245 grams of water and 25 grams of $Na_2S_2O_5$ with stirring, to effect hydrolysis to the alcohol and to remove iodine. The hydrolyzed mixture was then maintained at a temperature of 100° C. for an additional period of 3 hours. After cooling, the organic phase was taken up in ether, dried and the ether flashed off. Distillation of the oily residue gave 126 grams (0.20 mole) of $(CF_3)_2CFOCF_2CF_2(CF_2CF_2)_3CH_2CH_2OH$ B.P. 99–101° C./4 mm. Conversion and yield of the alcohol product were 77%.

Analysis showed for $C_{13}F_{23}H_5O_2$. Theoretical (percent): C, 24.76; F, 69.05; H, 0.79. Found (percent): C, 24.44; F, 69.53; H, 0.92.

EXAMPLE 4

Preparation of
$(CF_3)_2CFOCF_2CF_2CF_2CF_2CH_2CHI(CH_2)_9OH$

A 250 ml. 3-necked flask we charged with 210 grams (0.41 mole) of $(CF_3)_2CFOCF_2CF_2CF_2CF_2I$, 90 grams (0.53 mole) of undecylenic alcohol and 1 gram of alpha, alpha'-azobisisobutyronitrile catalyst. The resulting mixture was heated to 70–75° C. and maintained at that temperature for a period of 12 hours. Distillation of the reaction mixture gave 32 grams (0.062 mole) of $(CF_3)_2CFOCF_2CF_2CF_2CF_2I$ B.P. 40–43° C./25 mm., 34 grams (0.2 mole) of undecylenic alcohol, B.P. 90–100° C./2 mm. and 228 grams (0.33 mole) of $(CF_3)_2CFOCF_2CF_2CF_2CF_2CH_2CHI(CH_2)_9OH$, boiling at a temperature higher than 100° C./2 mm. Conversion and yield of the iodo alcohol were 81.5% and 96.0%, respectively.

Analysis showed for $C_{18}F_{15}H_{22}IO_2$. Theoretical (percent): C, 31.67; F, 41.78; H, 3.22; I, 18.62. Found (percent): C, 31.54; F, 41.02; H, 3.21; I, 17.75.

EXAMPLE 5

Preparation of $(CF_3)_2CFOCF_2CF_2CF_2CF_2(CH_2)_{11}OH$

A 2 liter 3-necked flask was charged with 500 ml. of anhydrous diethyl ether and 32 grams (0.86 mole) of $LiAlH_4$. To the resulting slurry were slowly added 228 grams (0.41 mole) of $(CF_3)_2CFOCF_2CF_2CF_2CF_2CH_2CHI(CH_2)_9OH$ in 300 grams of anhydrous ethyl ether. After the addition of the iodo alcohol was complete, the mixture was refluxed overnight. Addition of ethyl acetate followed by addition of $H_2SO_4$ were used to decompose the excess of $LiAlH_4$ present. The reaction mixture contained 2 phases. The upper phase was separated, dried and the ether flashed off. Distillation of the oily layer gave 131 grams (0.29 mole) of $(CF_3)_2CFOCF_2CF_2CF_2CF_2(CH_2)_{11}OH$, B.P. 110° C./0.5 mm., and 32 grams (0.05 mole) of starting iodo alcohol. Conversion and yield to the product alcohol were 71% and 81% respectively.

Analysis showed for $C_{18}F_{15}H_{23}O_2$. Theoretical (percent): C, 38.84; F, 51.26; H, 4.14. Found (percent): C, 38.52; F, 51.75; H, 4.82.

EXAMPLE 6

Preparation of
$(CF_3)_2CFOCF_2CF_2(CF_2CF_2)_2CH_2CHI(CH_2)_9OH$

A 350 ml. 3-necked flask was charged with 210 grams (0.34 mole) of $(CF_3)_2CFOCF_2CF_2(CF_2CF_2)_2I$, 75 grams (0.44 mole) of undecylenic alcohol and 1 gram of alpha, alpha'-azobisisobutyronitrile catalyst. The mixture was heated to 70–75° C. and maintained at that temperature for a period of 5 hours. Distillation of the reaction mixture gave 10 grams (0.016 mole) of unreacted iodide, B.P. 69–79° C./25 mm., 22 grams (0.13 mole) of undecylenic alcohol, B.P. 80–90° C./1 mm., and 227 grams (0.29 mole) of $(CF_3)_2CFOCF_2CF_2(CF_2CF_2)_2CH_2CHI(CH_2)_9OH$ B.P. 150–155° C./1 mm. Conversion and yield of the iodo alcohol were 84.5% and 89.0% respectively.

Analysis showed for $C_{20}F_{19}H_{21}IO_2$. Theoretical (percent): C, 30.69; F, 46.16; H, 2.83; I, 16.24. Found (percent): C, 31.04; F, 45.92; H, 2.75; I, 16.39.

EXAMPLE 7

Preparation of
$(CF_3)_2CFOCF_2CF_2(CF_2CF_2)_3CH_2CHI(CH_2)_9OH$

A 250 ml. 3-necked flask was charged with 210 grams (0.295 mole) of $(CF_3)_2CFOCF_2CF_2(CF_2CF_2)_3I$, 70 grams (0.41 mole) of undecylenic alcohol and 1 gram of alpha,alpha'-azobisisobutyronitrile catalyst. The mixture was heated to 70–75° C. for 12 hours. Distillation of the product mixture gave 14 grams (0.02 mole) of unreacted iodide, B.P. 40–42° C./2 mm., 30 grams (0.17 mole) of undecylenic alcohol, B.P. 90–100° C./2 mm. and 213 grams (0.24 mole) of $(CF_3)_2CFOCF_2CF_2(CF_2CF_2)_3CH_2CHI(CH_2)_9OH$ boiling greater than 100° C. at 2 mm. Conversion and yield of the iodo alcohol product were 82% and 88% respectively.

Analysis showed for $C_{22}F_{23}H_{22}IO_2$. Theoretical (percent): C, 30.00; F, 49.54; H, 2.49; I, 14.39. Found (percent): C, 31.07; F, 49.24; H, 2.56; I, 14.75.

EXAMPLE 8

Preparation of
$(CF_3)_2CFOCF_2CF_2(CF_2CF_2)_2(CH_2)_{11}OH$

A 2 liter 3-necked flask was charged with 500 ml. diethyl ether and 20 grams (0.53 mole) of $LiAlH_4$. To the resulting slurry were added 217 grams (0.278 mole) of $(CF_3)_2CFOCF_2CF_2(CF_2CF_2)_2CH_2CHI(CH_2)_9OH$. After addition of the iodo alcohol was complete, the mixture was refluxed overnight. Addition of ethyl acetate followed by addition of $H_2SO_4$ were used to decompose the excess of $LiAlH_4$ present. The reaction mixture contained 2 phases. The upper phase was separated, dried and the ether flashed off. Distillation of the oily layer gave 59 grams (0.09 mole) of $(CF_3)_2CFOCF_2CF_2(CF_2CF_2)_2(CH_2)_{11}OH$ B.P. 115° C./0.5 mm. and 102 grams (0.13 mole) of starting iodo alcohol, B.P. 135° C./0.5 mm. Conversion and yield of reduced alcohol were 32% and 61% respectively.

Analysis showed for $C_{20}F_{19}H_{23}O_2$. Theoretical (percent): C, 36.58; F, 55.03; H, 3.51. Found (percent): C, 37.12; F, 5.62; H, 3.72.

EXAMPLE 9

Preparation of 1,1,2,2-tetrahydrododecafluoro-8-heptafluoroisopropoxyoctyl acrylate (a) Preparation.—Into a 250 ml., 3-necked flask equipped with stirrer, thermometer and reflux condenser and Dean-Stark tube there are placed 68 grams of 1,1,2,2-tetrahydrododecafluoro - 8 - heptafluoroisopropoxyoctanol, together with 18 grams (0.25 mole) of acrylic acid, 0.7 gram of concentrated (96%) $H_2SO_4$, 2 grams of hydroquinone and 150 mole of benzene. This mixture is heated with stirring to reflux. After about 6 hours, approximately 3 grams of water collects in the Dean-Stark tube and the remaining material is transferred to a distillation flask. The benzene is flashed off and there are recovered several grams of the starting alcohol and a large quantity of the acrylate ester 1,1,2,2-tetrahydrododecafluoro-8-heptafluoroisopropyloctyl acrylate, $$(CF_3)_2CFO(CF_2)_2(CH_2)_6OCOCH=CH_2$$

EXAMPLE 10

Polymerization of 1,1,2,2-tetrahydrododecafluoro-8-heptafluoroisopropoxyoctyl acrylate Into a 100 ml., 3-necked flask were placed 2.8 grams of 1,1,2,2 - tetrahydrododecafluoro-8-heptafluoroisopropoxyoctyl acrylate, 20 grams of deionized water, 1.8 grams of an emulsifier (prepared by mixing 6 parts of cetyl dimethylamine, 2 parts of glacial acetic acid and 24 parts water), and 0.6 gram of 30% $H_2O_2$ solution. The mixture was flushed with nitrogen and heated to 55° C. for a period of 6 hours. At the end of this period a charge of 0.09 gram of sodium lauryl sulfate and 0.05 gram of $K_2S_2O_8$ was added and heating was continued for 2 additional hours. The resulting solid polymer mass was further coagulated with methanol, dried under vacuum and dissolved in 1,3-bis(trifluoroethyl)benzene.

EXAMPLE 11

Water and oil repellency tests of acrylate and methacrylate polymers

Acrylic and methacrylic polymers prepared from the novel alcohols of this invention were evaluated as textile treating agents for use in imparting oil and water repellency to the treated textile.

Water repellencies were measured by the Spray Test Method ASTM D–583–58 wherein water is sprayed against the taut surface of the fabric test specimen under controlled conditions and produces a wetted pattern indicative of the relative repellency or resistance to external wetting of the fabric. The fabric is rated by comparing its wetted pattern with pictures on a standard rating chart.

The procedure employed in determining the oil-repellency ratings is described, for example, on pp. 323–4 of the April 1962 edition of the Textile Research Journal. This procedure involves gently placing on the treated fabric drops of mixtures of mineral oil ("Nujol") and n-heptane in varying proportions. The drops are allowed to stand on the treated fabric undisturbed for 3 minutes. After the 3 minute time period the wetting and penetration of the fabric is visually observed. The number corresponding to the mixture containing the highest percentage of heptane which does not penetrate or wet the fabric is considered to be the oil-repellency rating of the treated fabric.

Hydrophobic properties of the treated cloth were determined by Method 22–1961 of the American Association of Textile Chemists and Colorists which is described, for example, on pp. 152–153 of the Technical Manual and Yearbook of that association for the year 1961.

Results of the tests are shown in Table I. The fabric used was 80" x 80" print cotton cloth.

In preparing the samples for test the 80" x 80" samples of cotton print cloth were saturated in the test solutions, following which the samples were dried at 110° C. for 5 minutes, cured at 160° C. for 3 minutes and then pressed and allowed to stand for 3 minutes before testing.

The polymer test materials were applied as aqueous emulsions, as obtained by polymerizing the respective monomers by the techniques and under the conditions described herein.

TABLE I.—EVALUATION OF POLYMERS FOR WATER AND OIL REPELLENCY

| Polymer | Weight loading, percent | WR | OR |
|---|---|---|---|
| A | 3.8 | 70 | 120 |
| B | 2.0 | 70 | 130 |

NOTE:
WR=Water repellency.
OR=Oil repellency.
A=$(CF_3)_2CFO(CF_2)_4(CH_2)_2OCO[C(CH_3)-CH_2]n$
B=$(CF_3)_2CFO(CF_2)_6(CH_2)_2OCO[CH-CH_2]n$

EXAMPLE 12

Demonstration of the surface active properties of $(CF_3)_2CFO(CF_2)_4(CH_2)_2OH$ About 5 mls. of $(CH_3)_2CFO(CF_2)_4(CH_2)_2OH$ are shaken with 100 mls. of distilled water. The mixture is placed into a separatory funnel and, after standing, unsolubilized alcohol (the heavy oil layer) is separated from the aqueous phase. Essentially all of the alcohol is recovered. The surface tension of the aqueous phase is measured (at 25° C.) and found to be substantially lower than the surface tension of untreated distilled water measured under the same conditions.

EXAMPLE 13

Use of $(CF_3)_2CFO(CF_2)_6(CH_2)_2OH$ as a solvent for solution polymerization A 100 ml. 3-necked flask is charged with 54 grams of $(CF_3)_2CFO(CF_2)_6(CH_2)_2OH$ solvent, 10 grams of
$(CF_3)_2CFO(CF_2)_6(CH_2)_2OCOC(CH_3)=CH_2$
monomer and 0.15 gram of alpha-alpha'-azobisisobutyronitrile as catalyst. The solution is purged for one hour with nitrogen, then heated to 75–80° C. and maintained at that temperature for a period of 12 hours under a blanket of nitrogen. A small weighed sample of the solution is then removed from the reaction mixture, the alcohol solvent is evaporated under subatmospheric pressure and the resulting solid polymer is isolated and reweighed. There is obtained a solids concentration of 15.0% by weight, indicating a 96.5% conversion of the monomer to a polymer. Theoretical solids concentration for 100% conversion of monomer to polymer is 15.6% solids by weight. The polymer sample is analyzed as follows: C, 33.75; F, 52.84; H, 2.45. Calculated for the polymer of the same composition: C, 33.16; F, 52.51; H, 2.26.

Since various changes and modifications may be made in the invention without departing from the spirit thereof, it is intended that all matter contained in the above description shall be interpreted as illustrated and not in a limiting sense.

We claim:
1. $(CF_3)_2CFO(CF_2)_4(CH_2)_2OH$.
2. $(CF_3)_2CFO(CF_2)_6(CH_2)_2OH$.
3. $(CF_3)_2CFO(CF_2)_8(CH_2)_2OH$.
4. $(CF_3)_2CFO(CF_2)_4(CH_2)_{11}OH$.
5. $(CF_3)_2CFO(CF_2)_6(CH_2)_{11}OH$.

(References on following page)

References Cited

UNITED STATES PATENTS

| | | | |
|---|---|---|---|
| 3,424,785 | 1/1969 | Pittman et al. | 260—615 R X |
| 3,388,078 | 6/1968 | Evans et al. | 260—615 R X |
| 2,826,564 | 3/1958 | Bovey et al. | 260—615 BF X |
| 3,358,033 | 12/1967 | Anello et al. | 260—615 R X |
| 2,713,593 | 2/1955 | Brice et al. | 260—615 R X |
| 3,293,306 | 12/1961 | Le Bleu et al. | 260—615 BF |
| 2,839,513 | 6/1958 | Ahlbrecht et al. | 260—615 R X |
| 3,576,885 | 4/1971 | Anello et al. | 260—611 R |

FOREIGN PATENTS

| | | | |
|---|---|---|---|
| 714,161 | 9/1968 | Belgium | 260—615 F |

HOWARD T. MARS, Primary Examiner

U.S. Cl. X.R.

117—143; 260—33.8 F, 33.8 UA, 86.1, 86.3, 86.7, 83.5, 89.5, 458, 486 H, 487, 611 R